United States Patent
Gommed et al.

(10) Patent No.: US 11,519,648 B2
(45) Date of Patent: Dec. 6, 2022

(54) PURGE SYSTEM FOR CLOSED-CYCLE ABSORPTION HEAT PUMPS

(71) Applicant: TECHNION RESEARCH AND DEVELOPMENT FOUNDATION LIMITED, Haifa (IL)

(72) Inventors: Khaled Gommed, Yaffia (IL); Gershon Grossman, Haifa (IL); Yigal Evron, Haifa (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 16/958,812

(22) PCT Filed: Dec. 31, 2018

(86) PCT No.: PCT/IL2018/051425
§ 371 (c)(1),
(2) Date: Jun. 29, 2020

(87) PCT Pub. No.: WO2019/130326
PCT Pub. Date: Jul. 4, 2019

(65) Prior Publication Data
US 2021/0071922 A1    Mar. 11, 2021

Related U.S. Application Data

(60) Provisional application No. 62/612,460, filed on Dec. 31, 2017.

(51) Int. Cl.
*F25B 43/04*    (2006.01)
*F25B 15/06*    (2006.01)
*F25B 30/04*    (2006.01)

(52) U.S. Cl.
CPC ............ *F25B 43/046* (2013.01); *F25B 15/06* (2013.01); *F25B 30/04* (2013.01); *F25B 2315/00* (2013.01)

(58) Field of Classification Search
CPC ........ F25B 43/046; F25B 15/06; F25B 30/04; F25B 2315/00; F25B 2700/19; F25B 2700/21
See application file for complete search history.

(56) References Cited

U.S. PATENT DOCUMENTS 2,703,968 A * 3/1955 Berestneff ............... F25B 15/06
                                                                  62/475
3,167,928 A * 2/1965 Swearingen .......... F25B 43/046
                                                                  62/85

(Continued)

OTHER PUBLICATIONS

International Search Report for PCT/IL2018/051425, dated Mar. 31, 2019 (3 pages).

(Continued)

*Primary Examiner* — Elizabeth J Martin
(74) *Attorney, Agent, or Firm* — Roach Brown McCarthy & Gruber, P.C.; Kevin D. McCarthy

(57) ABSTRACT

A high-efficiency, motorless purge system for closed-cycle absorption heat pumps, adapted for both absorption heat transformers and absorption chillers, using a series of valves to control the entry and exit of absorbent solution into a low-pressure, secondary absorption vessel. A small percentage of the total circulating solution is forced under pressure into the secondary absorption vessel via a spray nozzle, causing adiabatic absorption of absorbate vapor by the solution. Non-condensable gases accumulate in the secondary absorber until a certain vapor pressure is reached, upon which, gas, and possibly liquid, are transferred to an exhaust vessel having an exit vent for non-condensable gases. In an absorption chiller system, the secondary absorber has an (Continued)

internal heat exchanger to lower the temperature of the solution within, to facilitate the absorption process.

23 Claims, 6 Drawing Sheets

(56) References Cited

U.S. PATENT DOCUMENTS

| | | | |
|---|---|---|---|
| 3,259,182 A * | 7/1966 | Swearingen | F25B 43/046 165/111 |
| 3,301,005 A | 1/1967 | Eisberg | |
| 3,452,550 A | 7/1969 | Dyre et al. | |
| 3,949,566 A * | 4/1976 | Hopkins | F25B 15/06 62/475 |
| 4,458,499 A * | 7/1984 | Grossman | F25B 15/06 62/148 |
| 5,065,594 A * | 11/1991 | Yo | F25B 43/046 62/195 |
| 5,081,851 A * | 1/1992 | Murray | F25B 43/046 62/475 |
| 5,111,670 A * | 5/1992 | Furukawa | F25B 15/008 62/475 |
| 5,636,526 A * | 6/1997 | Plzak | F25B 15/06 62/475 |
| 6,457,326 B1 | 10/2002 | Serpente et al. | |
| 7,891,202 B1 * | 2/2011 | Gallus | F25B 43/046 62/115 |
| 2001/0009101 A1 * | 7/2001 | Ishikawa | F25B 43/046 62/475 |
| 2008/0190133 A1 * | 8/2008 | Zhang | F25B 43/046 62/474 |
| 2013/0031918 A1 * | 2/2013 | Yonezawa | F25B 43/046 62/85 |
| 2017/0144508 A1 * | 5/2017 | Tsubouchi | B60H 1/32014 |
| 2017/0205123 A1 * | 7/2017 | Cho | F25B 15/008 |

OTHER PUBLICATIONS

Written Opinion of the International Serach Report for PCT/IL2018/051425, dated Mar. 31, 2019 (5 pages).

* cited by examiner

PURGE SYSTEM FOR CLOSED-CYCLE ABSORPTION HEAT PUMPS

FIELD OF THE INVENTION

The present invention relates to the field of absorption heat pumps, including chillers and heat transformers, especially for designing high efficiency purge systems for the above.

BACKGROUND OF THE INVENTION

Non-condensable gases (NCG), such as hydrogen, carbon dioxide, nitrogen, oxygen, and argon, are known to cause a significant deterioration in the condensation and absorption heat and mass transfer processes in absorption systems used for thermal cooling and heating. Most absorption systems on the market are chillers, which operate with different types of working fluids, mostly water/ammonia or aqueous lithium-bromide ($LiBr/H_2O$). Almost universally, $LiBr/H_2O$ is the working fluid pair for absorption chilling equipment. Since water is the refrigerant, such chillers generally operate at relatively low pressure in the absorber, typically about 0.8 kPa, while the evaporator is operating at 4° C. This pressure is far below atmospheric pressure, which is about 100 kPa at sea level.

In such a closed system, the presence of NCGs reduces the thermal power and efficiency of the machine. One source of NCGs is the leakage of air into the machine, which operates at sub-atmospheric pressure. When the ambient atmospheric pressure is higher than that of the absorption system, NCG may enter through connections of pipes, flanges and other components that comprise the unit assembly. While all units are factory leak-tested to detect minute leaks, the machines are often not absolutely leak-tight. In addition, small amounts of hydrogen gas are generated through chemical reaction of the working fluid with the steel surfaces inside the machine. The hydrogen is present in sufficient volume to interfere with proper machine operation, and must be continuously removed. Corrosion inhibitors such as lithium molybdate reduce the hydrogen generation; nevertheless, proper operation of the system throughout its life requires periodic purging of the NCGs for satisfactory performance.

Absorption heat transformers (AHT) generally operate under significantly higher temperatures than absorption chillers, and hence the corrosion and hydrogen generation rate is expected to be higher. Experience with high-temperature absorbers and condensers is available from double- and triple-effect lithium bromide/water chillers.

An important point is that the deleterious effect of NCGs on the absorption and condensation processes goes far beyond the reduction of partial pressure of the absorbate/refrigerant (water in the case of $LiBr/H_2O$) due to the presence of the inert NCG. That is to say, if NCGs are present in the condenser at a mole fraction on the same order of magnitude as that of the refrigerant, the partial pressure of the latter would be reduced, and hence the effectiveness of condensation and the corresponding saturation temperature. Operating absorption systems never should, and in practice never do, reach a situation of such large NCGs content. However, it is found that even minute quantities of NCGs can reduce the heat and mass transfer in the absorber and condenser significantly. The reduction in mass transfer due to NCGs is related to the need for the refrigerant/absorbate vapour to diffuse through a thin layer of these gases, blocking its access to the vapour-liquid interface, before it can condense or be absorbed. Analytical studies have revealed that this reduction depends most critically on the ratio of resistance to absorbate diffusion between the liquid and the gas. Thus, even a trace amount of NCGs can significantly inhibit absorption.

Prior art solutions have been designed to address the issue of NCGs in absorption systems. Today, most large absorption chillers, i.e., those over 100 TR or ~350 kW, employ a vacuum pump to lift the NCGs to atmospheric pressure for discharge of nitrogen and small amounts of hydrogen.

In a typical arrangement for purging the absorber of an absorption chiller, the necessary components are: (1) the purge probe located in the absorber at the zone of minimum absolute pressure; this zone is generally at the bottom of the absorber, where the NCGs tend to accumulate as a result of their entrainment downward by water vapour flow and the absorbent solution falling over the absorber tubes; (2) A small absorber, with the solution cooled to reduce its vapour pressure below that of the main absorber, thus inducing a flow of NCGs and water vapour continuously while the machine is in operation; this small absorber serves the function of a cold trap that exists in many other vacuum pump applications; and (3) the vacuum pump, equipped with its own oil trap and valve. The NCGs collect and are concentrated in the small absorber, with most of the refrigerant water vapour being absorbed by the solution. The vacuum pump, operated by a timer or by other means, removes the NCGs and ejects them into the atmosphere.

In addition to using a vacuum pump, the small absorber (2) of the purging system must be designed carefully to be maintained at a pressure lower than that of the main absorber. Hence, it must be cooled by the lowest temperature heat sink available to below the temperature of the main absorber.

Purge systems based on the use of vacuum pumps are mostly reliable; the vacuum pump must produce a very low pressure at all times. However, with use, the oil in the vacuum pump may become diluted with condensed water vapour, thereby increasing the vapour pressure of the oil. Thus, to consistently achieve the low pressure required for the removal of NCGs, diligent maintenance of the vacuum pump is needed. In addition, there is a disadvantage of losing some of the refrigerant/absorbate (water) from the system. To prevent excessive refrigerant/absorbate (water) loss in direct use of vacuum pump, the in-line configuration may be adopted. In this case, there is a risk of contaminating the machine with oil unless an oil-free vacuum pump is used.

Another type of purge system may be based on direct use of an in-line vacuum pump. The vacuum pump would be connected to the NCG purge probes in the vapour space in the condenser and in the absorber, thus inducing a flow of NCGs and refrigerant/absorbate vapour. The pumped mixture would enter the liquid trap where the vapour condenses and is returned as liquid to the absorption machine, and the NCGs accumulate. The accumulation process is monitored by recording the amount of accumulated NCGs as a function of time.

Thirdly, certain $LiBr/H_2O$ absorption chillers use, instead of a vacuum pump, a motorless purge system, based on an ejector. The ejector employs part of the high-pressure (above ambient pressure) solution stream leaving the solution pump, as a motive fluid, to suck and entrain vapor from the absorber and condenser. The ejector thus pumps the water vapor containing a small fraction of NCGs into a storage chamber, which is essentially the equivalent of a cold trap. The vapour condenses and the NCGs accumulate. Periodically, the operator of the chiller takes action to exhaust the NCGs from this storage chamber to the atmosphere. Such an ejector-based purge system, is described in U.S. Pat. No. 3,597,936 to Dyre et al, for "Purge system for lithium bromide absorption water chiller" assigned to the Carrier Corporation.

Of the various parts of the aforementioned purge system, the key components are the ejectors. In the aforementioned ejector based purge system, a liquid motive stream must be used to entrain a vapor stream. This makes the interaction between the two quite difficult because the vapor specific volume is roughly 1000 times larger than that of the liquid. In addition, comparison of an ejector-based purge system serving in a chiller with one serving in a heat transformer, shows that the ejectors in the latter operate under much higher pressures, as well as having higher pressure-ratios (typically 16.5 in a heat transformer vs. 6.0 in a chiller).

Furthermore, in these ejector-based purge systems, there is a risk of the motive solution boiling inside the ejector during expansion through the nozzle. To prevent this, it may be required to sub-cool the motive stream. However, given the low suction pressure, cooling the motive solution sufficiently to prevent boiling is energetically costly and therefore would translate into a reduction of the power and thermal efficiency of the machine. In addition to the aforementioned drawbacks of the ejector-based purge system, the design and construction of such special type ejectors requires singular expertise and produces ejectors lacking both the ability to deal with variable operating conditions of the absorption machine and the flexibility to be readily adapted to different machines.

Whereas both absorption chillers and absorption heat transformers require purging, several important differences between the two systems must be addressed. One is the much higher pressures and pressure ratio used in the heat transformer. Another is that NCGs tend to migrate to the region of lowest pressure in the system. The component of lowest pressure in a chiller is the absorber, while in the heat transformer it is the condenser. In general, lower pressure vessels are more sensitive to the presence of NCGs. In the condenser, the presence of NCGs near the liquid-gas interface increases the thermal resistance, while in the absorber the presence of NCGs also increases the mass-transfer resistance. Therefore, absorbers tend to be more sensitive to the presence of NCGs than condensers, even if operating at the same pressure levels. Hence, purging the NCGs from both the absorber and condenser of the absorption machines are of critical importance.

Existing methods for purging absorption systems thus fall into three categories, each with its unique disadvantages. Purge systems that exist in practice and in the literature are for absorption chillers and do not provide a solution for purging NCGs from absorption heat transformers. The three most common methods used are vacuum pump-assisted secondary absorber, liquid/gas ejector, and vacuum pump, with the latter being by far the most common.

Because NCGs migrate to the location of lowest pressure in the absorption chiller, a small portion of the vapor can be extracted from this and condensed in the purge unit using a cooling medium. NCGs can then be evacuated by the vacuum pump. Direct use of a stand-alone standard vacuum pump has the disadvantages of loss of refrigerant (water vapor) from the system and the use of a motorized component that needs continuous maintenance. Direct use of a stand-alone dry (oil-free) vacuum pump has the disadvantage of requiring a specialized motorized component. Use of a secondary, small absorber-based method assisted by a vacuum pump has the advantage of minimizing loss of refrigerant; however, this benefit comes at the expense of requiring an additional absorber necessitating fine-tuning for the prerequisite cooling to be maintained at a pressure lower than that of the main absorber. Finally, the design and manufacturing of a motorless, ejector-based method (shown for AHT in FIG. 3) may be problematic and difficult to successfully operate under these conditions, requiring expertise and lacking the flexibility to deal with varying operating conditions. In addition, such components must be custom-made for each machine and cannot be easily adapted to other systems.

There therefore exists a need for a simple, robust, and efficient purge system for both absorption chillers and heat transformers, which overcomes at least some of the disadvantages of prior art systems and methods. The disclosures of each of the publications mentioned in this section and in other sections of the specification, are hereby incorporated by reference, each in its entirety.

SUMMARY

The present disclosure describes new exemplary systems for motorless NCG purging with notable advantages over available designs. The systems may be adapted to work with any number of absorption systems, in particular both absorption heat transformers and absorption chillers.

The purging system for an absorption heat transformer comprises a vacuum-tight adiabatic absorption vessel (AAV) distinct from the absorber component of the absorption system, an exhaust vessel for collecting water vapor and evacuating the NCGs, a water-to-solution heat exchanger, solution splitter, and associated valves and instruments for controlling the purging operation. Valves regulating streams of water vapor or solution leading into the secondary AAV are normally open during the normal operation of the heat transformer.

The absorption heat transformer operates at two pressure levels. The high pressure, $P_H$, exists at the absorber-evaporator pair while the low pressure, $P_L$, exists at the desorber-condenser pair. This purging system operates in the following way. Water vapor containing NCGs from the absorber at $P_H$ and condenser at $P_L$ is brought into a small cell at lower pressure, in which the water vapor will condense while the remaining NCGs are stored. Saturated solution such as $LiBr/H_2O$ at high concentration and intermediate temperature, from the desorber is split into two streams. The main stream continues, as in a prior art absorption heat transformer, through the solution-to-solution heat exchanger to the absorber. A smaller solution branch comprising approximately 5-10% of the total solution is cooled by about 5° C.-15° C., by passing through the water-to-solution heat exchanger, following which it is sprayed by a spray nozzle into the AAV. The required pressure of the solution imposed by the solution pump at the spray nozzle inlet is above ambient pressure.

Optionally, it is possible to integrate the external refrigerant-solution heat exchanger into the AAV, rendering it a non-adiabatic absorption vessel.

The fine droplets of the sub-cooled solution entering the AAV through the spray nozzle are able to adiabatically absorb the water vapor entering the AAV before reaching the liquid solution pool at the bottom of the vessel. Separation of the NCGs present within the vapor is achieved as a result of absorbing the water vapor by the subcooled solution. Hence, the NCGs start to accumulate inside the vessel. The sprayed sub-cooled solution creates a low vapor pressure, the lowest pressure in the system, typically slightly lower than $P_L$, inside the vacuum-tight AAV. The water vapor from the condenser, in addition to that from the absorber, is thus forced to flow into the AAV. The water vapor coming from the absorber has much higher pressure than that existing in the AAV. Therefore, the flow must be restricted. A restrictor valve may be added to restrict the maximum flow rate of vapor reaching the AAV from the absorber. In one implementation, the water vapor coming through the purging line from the absorber is replaced by connecting the outlet from the absorber through a metering valve directly to the condenser line. In this case, only a single valve connected to the purging line from the condenser is needed. The solution leaving the AAV is channeled back to the desorber through an outlet port. To prevent direct access of vapor from the AAV to the desorber space, the liquid solution pool inside the AAV is maintained at a level at or above the level of the solution pool inside the desorber vessel.

When a certain amount of NCG has accumulated inside the AAV, an evacuation process may be activated. The evacuation process may be implemented during the normal operation of the heat transformer by simply closing the normally open valves leading to the AAV, preventing vapor from the condenser and absorber from entering the AAV. Closing the valve leading to the desorber prevents return of solution from the AAV, causing a rise in both pressure and in the solution pool level within the AAV. When the pressure increases to above ambient pressure, the raised liquid level will force the vapor to flow out of the vessel through a gas check/relief valve to the liquid pool of the exhaust vessel. The water vapor passing through the liquid pool in the exhaust vessel will condense within the liquid, whereas the NCGs will rise in the form of bubbles outside the liquid pool through the one-way vent exit to the ambient environment.

The purge system of the current disclosure may also operate as an ejector-based purging system for an absorption system (chillers and heat transformers). Such systems will be referred to as ejector purge systems for absorption chillers, but such systems are also appropriate for heat transformers. Operation of the purge system in this implementation is similar to that described above for an absorption heat transformer, with the differences explained herein below. Within the absorption vessel (AV) is an internal heat exchanger located above the fluid level, through which cooling water flows, such as from and to a cooling tower. The purging system for the chiller further comprises a steam-steam ejector, that may be supersonic, to entrain the lower pressure vapor from the absorber using the higher pressure stream from the condenser.

Like the absorption heat transformer, the absorption chiller operates at two pressure levels. However, in a chiller, the higher pressure, $P_H$, exists at the desorber-condenser pair, whereas the low pressure, $P_L$, exists at the absorber-evaporator pair. The water vapor containing NCGs is brought from both the absorber operating at $P_L$ and from the condenser operating at $P_H$, into a small cell, in which the water vapor will condense while the remaining NCGs are stored.

Because in the purging system for absorption chillers, the solution coming from the absorber has a lower absorbent concentration than that coming from the desorber, and almost the same temperature as the available ambient heat sink, the purging absorption vessel (AV) must be an internally cooled absorber. In addition, the pressure in the purging AV is designed to be similar, or slightly higher than the lower pressure, $P_L$, of the chiller absorber. Thus, vapor would not necessarily be drawn into the AV at a sufficient rate. Hence, a steam-to-steam ejector is used to force vapor to flow from the chiller absorber at $P_L$ into the AV. The ejector uses the high-pressure vapor stream at $P_H$ from the condenser as the motive stream to entrain a secondary vapor stream from the absorber, both streams passing through a collecting cell before going through the ejector's diffuser. Thus, streams from the absorber and condenser enter the purging AV at a pressure level that lies between $P_L$ and $P_H$. The advantage of this design is that the pressure level at the ejector outlet enables the purging AV to operate at a pressure above that of the chiller absorber, saving the need for a special, thermally designed absorption vessel.

Whereas the purging system in the current disclosure may be used as a motorless purge system, a more efficient NCG evacuation process employing a standard vacuum pump may be used in-line with the purging system for either an absorption chiller or an absorption heat transformer. The vacuum pump is connected to an optional port exiting the AV via a tube having a usually closed valve. During the normal operation of the absorption system, the following steps may be performed for the evacuation procedure. First, all the normally open valves leading to and from the AV are closed. The vacuum pump is turned on, followed by opening of the valve connecting the pump to the AV. After a good vacuum is reached, the valve is closed, and the vacuum pump is turned off. Finally, all the normally open valves are opened. At this point, all NCGs have been evacuated from the system.

There is thus provided in accordance with a first exemplary implementation of the systems described in this disclosure, a motorless purge system for removing non-condensable gases from a closed cycle absorption heat pump comprising an absorber, a condenser and a desorber, the system comprising, (i) an absorption vessel adapted to collect through a first valved fluid passageway, a portion of the absorbent solution of the closed cycle absorption heat pump, (ii) an absorbent solution distributer adapted to introduce the portion of the absorbent solution into the absorption vessel, such that the absorbent solution absorbs absorbate vapor entering the absorption vessel, (iii) an exhaust vessel having a vent exit, the exhaust vessel fluidly connected to the absorption vessel by a second valve, and (iv) further valved fluid passageways adapted to convey (a) absorbate vapor from the absorber and the condenser into the absorption vessel, and (b) solution accumulated in the absorption vessel to either the desorber if the heat pump is an absorption heat transformer, or the absorber, if the heat pump is a chiller system, wherein closing of the further valved passageways is configured to increase the pressure in the absorption vessel, such that when the second valve is open, the non-condensable gases are collected in the exhaust vessel, such that they are expellable through the vent exit.

In such a system, the absorption vessel may be at a lower pressure than the absorber and the condenser, such that the absorbate vapor entering the absorption vessel may condense to a liquid, while non-condensable gases entering the absorption vessel may remain in a gaseous state.

Furthermore, in any of the above described systems, the closing of the further valved passageways may be performed when the concentration of accumulated non-condensable gases in the absorption vessel reaches a predetermined level.

Furthermore, in any of the above described systems, the exhaust vessel may be adapted either to collect the non-condensable gases and absorbent solution from the absorption vessel through a check valve on a continuous basis and to exhaust them continuously from the vent exit, or may be adapted to collect non-condensable gases and vapor, and to release the non-condensable gases when a pressure above ambient pressure has been attained.

According to yet further implementations, in the systems described in this disclosure, the increase in pressure in the absorption vessel may be generated by the pressure of the absorbent solution of the closed cycle absorption heat pump, entering the absorption vessel. Alternately, the increase in pressure may be generated by a gas-gas ejector, adapted to entrain vapor and non-condensable gases at low pressure from the condenser, into a stream of vapor and non-condensable gases at high pressure from the absorber.

Additionally, in any of the above described systems, the system may further comprise a heat exchanger for cooling the portion of the absorbent solution. The heat exchanger may be positioned in the first valved fluid passageway. Alternately, the heat exchanger may be positioned within the absorption vessel.

Furthermore, in the motorless purge system in any of the above described systems, the solution distributer for injecting the portion of the absorbent solution into the absorption vessel under pressure, may be either a spray nozzle, or a drip distribution array. Furthermore, if a spray nozzle, it may be adapted to produce spray droplets below a predetermined size, such that the surface to volume ratio of the drops may ensure rapid absorption of absorbate molecules.

The system in any of the above disclosed embodiments may purge non-condensable gases due to a difference between the vapor partial pressure and the liquid vapor pressure in the absorption vessel.

Furthermore, in any of the above described systems, the system may further comprise the use of the relationship between actual temperature and/or pressure and predicted temperature and/or pressure in the absorption vessel, to estimate the quantity of non-condensable gases in the absorption vessel.

Additionally, according to any of the above described systems, the valved fluid passageway that conveys fluid accumulated in the absorption vessel to either (i) the desorber, or (ii) the absorber, that valved fluid passageway may be positioned at a height that prevents absorbent solution backflow from the desorber or absorber to the absorption vessel.

Yet other implementations described in this disclosure perform a method of motorless purging of non-condensable gases from the absorbent solution of a closed cycle absorption heat pump comprising an absorber, a condenser and a desorber, the method comprising:

(i) introducing a cooled sample of the absorbent solution into an absorption vessel, such that the sample disperses into droplets, the droplets having the capacity to rapidly absorb absorbate in the absorption vessel, the absorbate being received through valved passageways as vapor from the absorber and the condenser, (ii) returning solution from the absorption vessel through a passage having a first valve, to the desorber if the heat pump is an absorption heat transformer, or to the absorber, if the heat pump is a chiller system, (iii) when the concentration of non-condensable gases in the absorption vessel has reached a predetermined level, closing the valved passageways and the first valve, such that the pressure in the absorption vessel increases, so that vapor comprising non-condensable gases from the absorption vessel is transferred via a second valved passageway, to an exhaust vessel having a vent exit, and (iv) exhausting the non-condensable gases from the exhaust vessel via the vent exit. In such a method, the cooled sample of the absorbent solution may be, but is not limited to, being introduced into the absorption vessel through a spray nozzle or a drip distribution array. Additionally, the spray nozzle may be adapted to produce spray droplets below a predetermined size, such that the surface to volume ratio of the drops ensures rapid absorption of absorbate molecules.

In some implementations of any of the methods described above, the exhaust vessel may collect the non-condensable gases and absorbent solution from the absorption vessel through a check valve on a continuous basis and exhaust them continuously from the vent exit. Alternatively, it may collect non-condensable gases and vapor, and release the non-condensable gases when a pressure above ambient pressure has been attained by transfer of vapor comprising non-condensable gases from the absorption vessel to the exhaust vessel via the second valved passageway.

In some implementations of any of the methods described above, the increase in pressure in the absorption vessel may be generated by the pressure of the absorbent solution of the closed cycle absorption heat pump entering the absorption vessel. Alternatively, the increase in pressure may be generated by a gas-gas ejector, adapted to entrain vapor and non-condensable gases at low pressure from the condenser, into a stream of vapor and non-condensable gases at high pressure from the absorber.

According to any of the implementations of the methods as described above, the method may further comprise the step of cooling the sample of the absorbent solution using a heat exchanger, before its entry into the absorption vessel. Alternatively, the step of cooling the absorbent solution may use a heat exchanger in the absorption vessel.

According to any of the implementations of the methods as described above, the quantity of non-condensable gases in the absorption vessel may be estimated from the relationship between actual temperature and predicted temperature in the absorption vessel. Additionally or alternatively, the quantity of non-condensable gases in the absorption vessel may be estimated from the relationship between actual pressure and predicted pressure in the absorption vessel.

According to any of the implementations of the methods as described above, the passage having a first valve connecting the absorption vessel with either (i) the desorber or (ii) the absorber, may be positioned at a height such that backflow of absorbent solution from the desorber or the absorber to the absorption vessel, is prevented.

According to any of the implementations of the methods as described above, a difference between the vapor partial pressure and the liquid vapor pressure in said absorption vessel may enable the non-condensable gases to be purged.

In a number of locations in this disclosure, reference is made to a valve in a passageway or tube for controlling the flow therethrough. It is to be understood that use of the terminology "a valve" is not meant to limit the item to a single valve, but that the term is meant also to cover the situation where more than one physical valve is used for performing the valving operation. In that respect, such components of the systems are understood to mean valved passageways, regardless of the number of valves used along the passageway, and are also thuswise understood to be claimed.

Additionally, the absorbent solution of the system may have been variously described as a working fluid, or just the solution, or the absorbent, and it is to be understood that all such terminology may have been used and are intended to refer to the absorbent solution of the presently described systems in this application.

BRIEF DESCRIPTION OF THE DRAWINGS

The presently claimed invention will be understood and appreciated more fully from the following detailed description, taken in conjunction with the drawings in which:

DETAILED DESCRIPTION

Figure 1:
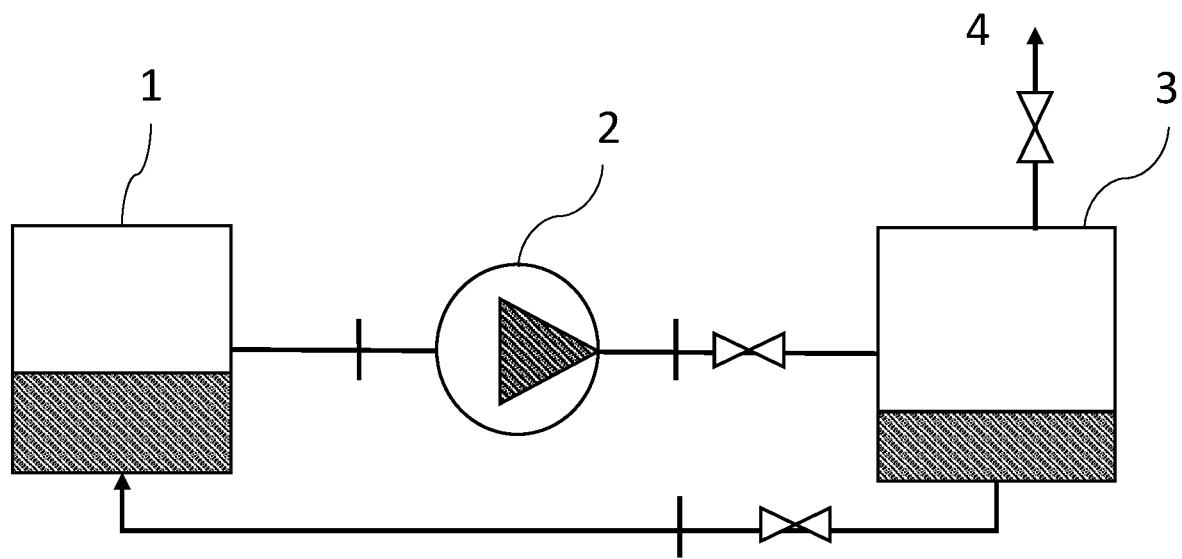
FIG. 1 is a schematic representation of a typical prior art vacuum pump purging system for a LiBr-water absorber in a chiller.

Examples of prior art purge systems are shown in FIG. 1 and in U.S. Pat. No. 3,597,936 to Dyre et al, as summarized in the background and briefly described below. FIG. 1 shows an NCG purging system for a lithium bromide-water absorption system, comprising an absorption system vessel 1 connected via a vacuum pump 2 to a cold trap and reservoir 3, from which NCGs are released through a release valve 4. U.S. Pat. No. 3,597,936 shows a schematic description of an ejector-based motorless purge system for a chiller. With this system, purge operation is automatic, motorless and continuous. The NCGs are trapped outside the machine and cannot re-enter even during shut down.

Figure 2A:
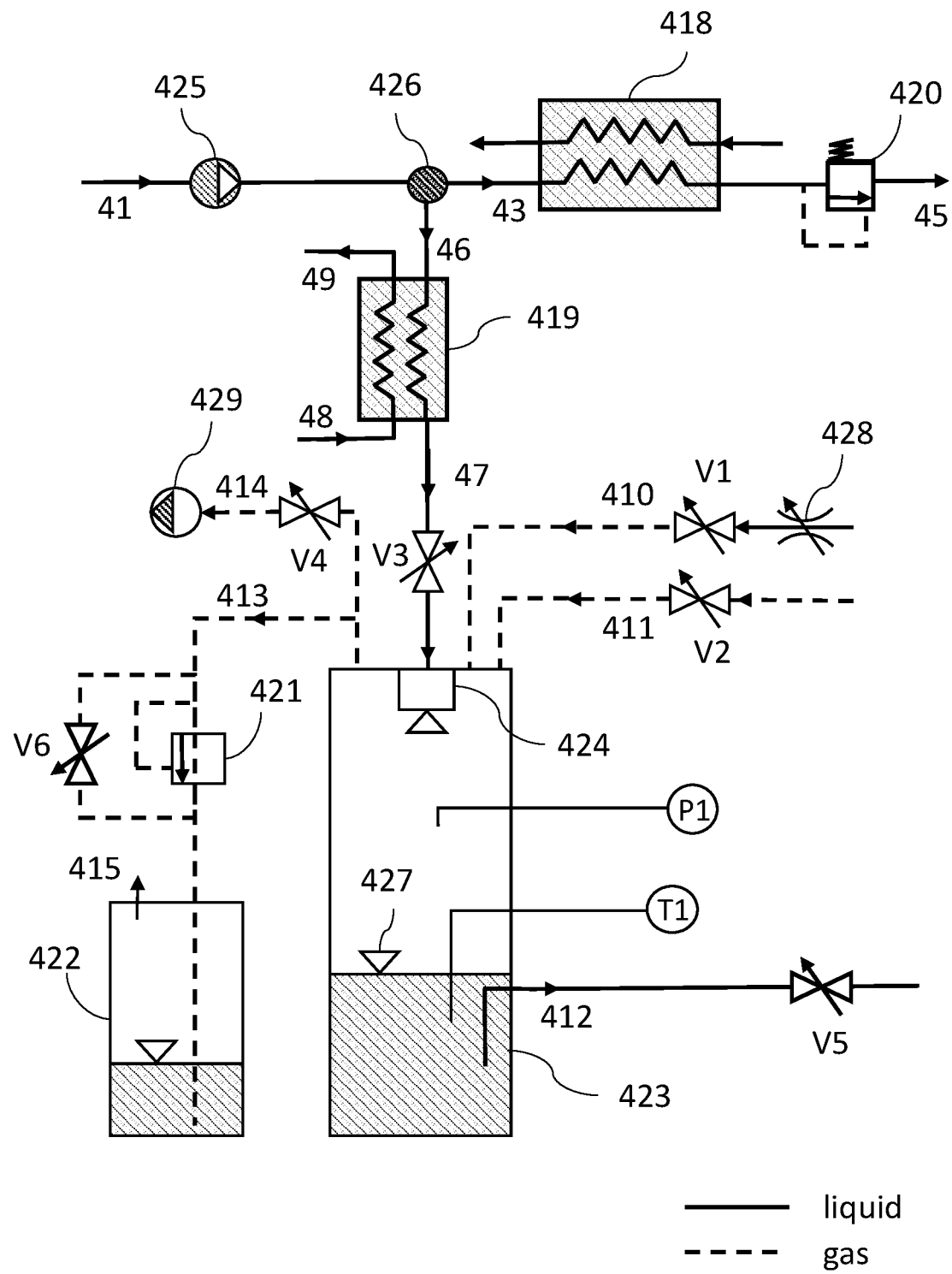
FIG. 2A illustrates schematically an adiabatic absorber-based motorless purge system for an absorption heat transformer.

Reference is now made to FIG. 2A, showing a schematic description of the adiabatic absorber-based purging system for an absorption heat transformer, as described in the present application. The purging system comprises a vacuum tight adiabatic absorption vessel (AAV) 423, an exhaust vessel 422 for collecting water vapor and evacuating the NCGs, a water-to-solution heat exchanger 419, solution splitter 426, and associated valves and instruments for controlling the purging operation. Valves V1, V2, V3, V5 are normally open during the normal operation of the heat transformer, while valves V4 and V6 are normally closed.

Figure 2B:
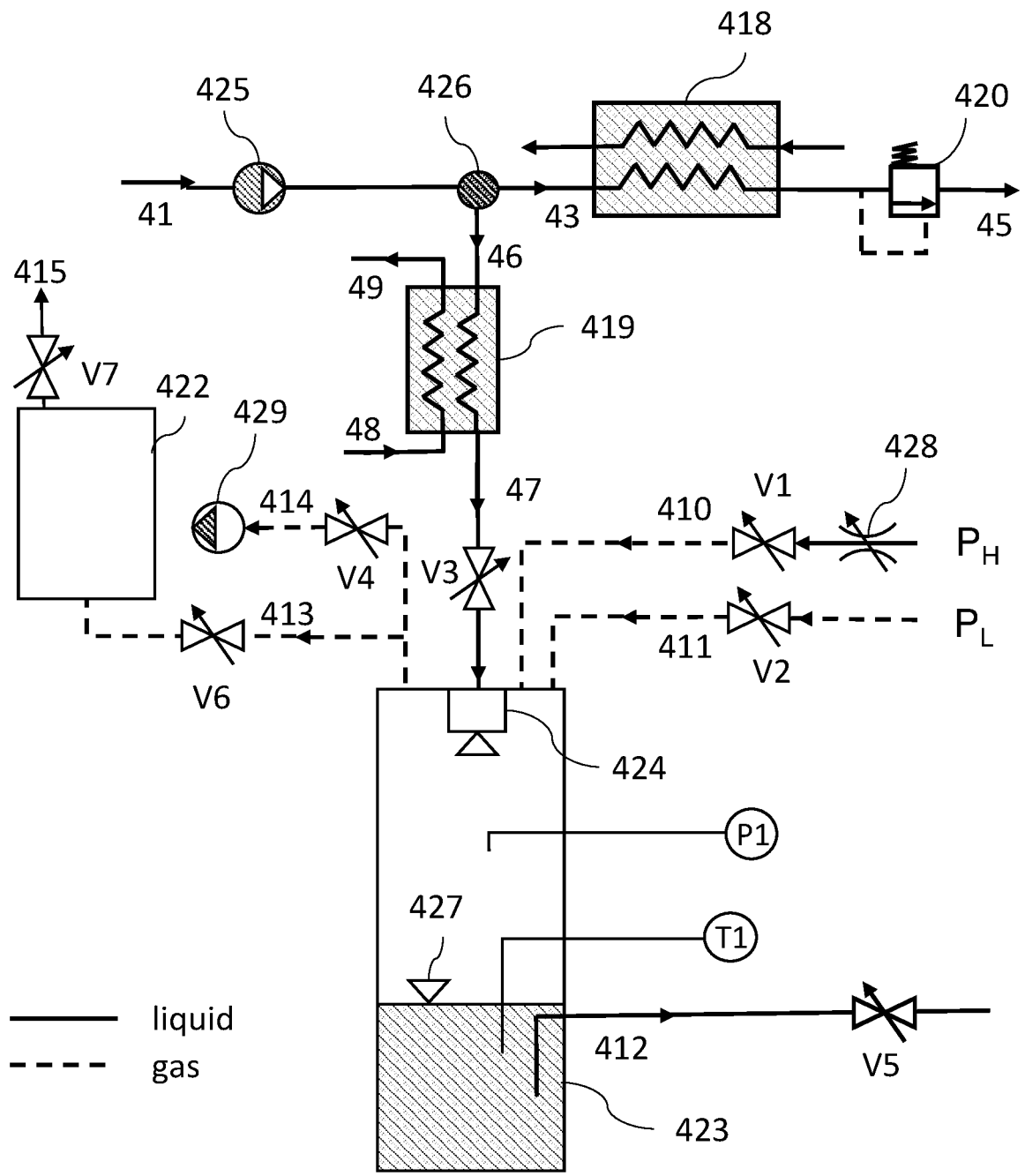
FIG. 2B illustrates an alternative evacuation method for the non-condensable gases.

Reference is now made to FIG. 2B, similar to FIG. 2A, showing an alternative evacuation method. Here, vessel 422 is elevated above 423. Valve 421 of FIG. 2A is not used. The vessel 422 is connected (as in FIG. 2A) to vessel 423 by line 413 and valve V6. An additional valve V7 on line 415 is added. However, in this version valve V6 is normally opened, and V7 is normally closed.

In the absorption heat transformer there are typically two pressure levels. Although more pressure levels can exist in general, for the sake of simplicity the following description considers the prevailing use of two pressure levels. The high pressure, $P_H$, exists at the absorber-evaporator pair while the low pressure, $P_L$, exists at the desorber-condenser pair. Water vapor (containing NCGs) from both the absorber and condenser (operating at different pressures) is brought into a small cell 423 at lower pressure, in which the water vapor will condense while the remaining NCGs are stored.

The purging system operates in the following way. Saturated solution 41, typically LiBr/H$_2$O at high concentration and intermediate temperature, from the desorber (not shown) is pumped by the solution pump 425 and then split by the solution splitter 426 into two streams, 43 and 46. The main stream 43 continues, as in its role in a prior art absorption heat transformer, through the solution-to-solution heat exchanger 418 and the solution check valve 420 via stream 45 to the absorber (not shown). The solution branch stream 46 (typically 5-10% of the main flow) is sub-cooled, typically by 5° C. to 15° C., by passing through the water-to-solution heat exchanger 419. It then passes as stream 47 through valve (V3) and is sprayed by the solution spray nozzle 424 into the AAV 423. Optionally, it is possible to integrate the external refrigerant-solution heat exchanger 419 into the AAV 423, rendering it a non-adiabatic absorption vessel.

The required pressure of the solution imposed by the solution pump 425 at the spray nozzle inlet is above ambient pressure.

There are no heat losses related to the sub-cooling level of the solution, since all the heat extracted from the solution 46 by passing through the water-solution heat exchanger 419 for the sub-cooling purpose is needed to heat up the condensate water stream 48 leaving the condenser towards the evaporator in stream 49.

The sprayed sub-cooled solution creates a low vapor pressure, the lowest pressure in the system, typically slightly lower than $P_L$, inside the vacuum-tight AAV 423. The water vapor flowing in stream 411 from the condenser, in addition to that flowing in stream 410 from the absorber, is thus forced to flow into the AAV 423.

The water vapor 410 coming from the absorber has much higher pressure than that existing in the AAV 423. So, a restrictor valve 428 may be added to restrict the maximum flow rate of vapor reaching the AAV 423 from the absorber.

In one implementation, the water vapor coming through the purging line 410 from the absorber (through valve V1) is replaced by connecting the purging outlet from the absorber through a metering valve directly to the condenser line. In this case, only the purging line from the condenser through valve V2 would be used.

The fine droplets of the sprayed sub-cooled solution are able to adiabatically absorb the water vapor entering the AAV 423 before reaching the liquid solution pool at the bottom of the AAV. Separation of the NCGs present within the vapor is achieved as a result of absorbing the water vapor by the subcooled solution. Hence, the NCGs start to accumulate inside the vessel 423 until the next evacuation process.

The spray nozzle 424 produces fine solution droplets, which greatly enhances the adiabatic absorption process and saves the need for a more complicated absorber. Calculations show that the required amount of water vapor to be absorbed is no more than 1% of the solution mass flow rate entering the AAV 423. The aforementioned absorption mass ratio can be easily achieved by the adiabatic absorption.

The solution entering the AAV 423 through the spray nozzle 424 leaves the vessel after absorption through the solution outlet 412 back to the desorber. To prevent direct access of vapor from the AAV 423 to the desorber space through the outlet port, the liquid solution pool inside the AAV 423 is maintained at a certain level 427. The shape of the tube for solution return to the desorber may include a bend to ensure that a minimum required liquid level remains in the solution pool of the AAV 423. The level of the solution outlet tube, shown by stream 412, must be at or above the level of the solution pool inside the desorber vessel (not shown).

For an absorption heat transformer working at steady state conditions, the solution at the outlet of the desorber has a certain concentration, for example 0.58 LiBr mass fraction. Hence, for the case where no NCGs are present in the vapor phase and the liquid has a given solution concentration, there is a direct correlation between the temperature and saturation pressure inside the AAV 423; as the temperature (T) increases, the solution saturation vapor pressure (P) increases. The solution concentration can be measured or estimated according to steady state calculations. The solution saturation pressure inside the AAV could then be calculated as a function of the solution concentration and temperature, measured by the temperature sensor T1. Comparing the actual pressure, measured by the pressure sensor P1, with the calculated saturation pressure of the solution inside the AAV 423 provides a good estimation of the amount of NCGs accumulated inside the vessel. Since the vessel volumes are known, this pressure difference is a direct consequence of the NCGs partial pressure.

Another means of estimating the amount of accumulated NCG in the AAV 423 is based on changes in temperature. The adiabatic absorption inside the vessel causes a rapid increase in the temperature of the solution, of the order of up to 10° C. As NCG accumulates inside the vessel 423, the intensity of the adiabatic absorption will decrease and hence the temperature rise of the solution will decrease as well. Therefore, assuming the temperature at stream 47 is known, measuring the temperature increase of the solution entering the vessel (T1 minus temperature at 47) provides a qualitative reverse indicator of the amount of accumulated NCG inside the vessel. In other words, as NCGs accumulate, this temperature increase will diminish.

When a certain amount of NCG has accumulated inside the AAV 423 (determined by either of the aforementioned methods, or by any other methods), an evacuation process of NCG may be activated. The proposed motorless evacuation process requires that the solution pump 425 maintains above-atmospheric pressure at stream 47. The motorless evacuation process may be implemented during the normal operation of the heat transformer by simply closing valves V1, V2, and V5. Closing valves V1 and V2 prevents vapor from the condenser, via stream 411, and from the absorber, via stream 410, from entering the AAV 423. Closing valve V5 prevents return of solution via stream 412 from the vessel 423 to the desorber. Closing valve V5 while continuing to inject more solution through the spray nozzle, will cause a rise in both pressure and in the solution pool level within the AAV 423. Two alternative methods are now proposed:

1. (FIG. 2A) When the pressure increases to above ambient pressure, the raised liquid level will force the vapor to flow through vapor line 413 out of the vessel through the gas check/relief valve 421 to the liquid (water or solution) pool of the exhaust vessel 422. The water vapor passing through the liquid pool in the exhaust vessel 422 will condense within the liquid, whereas the NCGs will rise in the form of bubbles, to above the liquid pool through the vent exit 415 to the ambient environment. This process should be stopped as soon as the liquid level in vessel 422 begins to rise—indicating that all the gasses above the liquid level have been removed from 423. At this point valve V5 should be reopened until the measured pressure P1 drops to the low pressure vessel level. At this point, V1 and V2 are also reopened and the system returns to normal operation. Note that at this point the pressure in vessel 422 is ambient, and the pressure in vessel 423 is much lower. The amount of solution which was transferred from the AAV 423 to the exhaust vessel 422 during the evacuation process should be returned to vessel 423. This can be done by opening valve V6 to enable the return of some liquid from the exhaust vessel 422, through the line 413, to the AAV 423, and then closing valve V6 again.

2. (FIG. 2B) During steady state AHT operation, V6 is normally open (NO). During the evacuation process, as the solution fills vessel 423, the pressure will increase and will fill vessel 422 with a mixture of pressurized NCGs, some vapor, and possibly some liquid solution (depending on the volume of 422). When the pressure stabilizes above atmospheric pressure, V6 is closed. Next, the normally closed (NC) V7 is opened to release the pressurized gasses to the atmosphere. A short while later, long enough to allow accumulated NCGs to escape, typically a few seconds, V7 is closed, then V6 and V5 are reopened until the measured pressure P1 drops to the low pressure vessel level. At this point, V1 and V2 are reopened and the system returns to normal operation.

If an optional vacuum pump 429 is available, can be connected through line 414 as shown in FIGS. 2A and 2B, because it can replace the above processes in case of a malfunction. In this motorized evacuation process, it is crucial to keep V3 closed throughout the evacuation stage of vessel 423 (to make sure that liquid solution will not enter the vacuum pump). This evacuation mode is also useful in case solution pump 425 is unable to produce above atmospheric pressure at line 47. Note that although this evacuation process is motorized, the NCGs trapping process in the AAV 423 is motorless. In addition, this vacuum pump method is more efficient than alternative prior art methods using a vacuum pump for two reasons: (1) the pump is not continuously operated, and only removes gases from an isolated vessel 423, and (2) no special requirements for the vacuum pump are needed, such as in-line oil-free operation.

Figure 3:
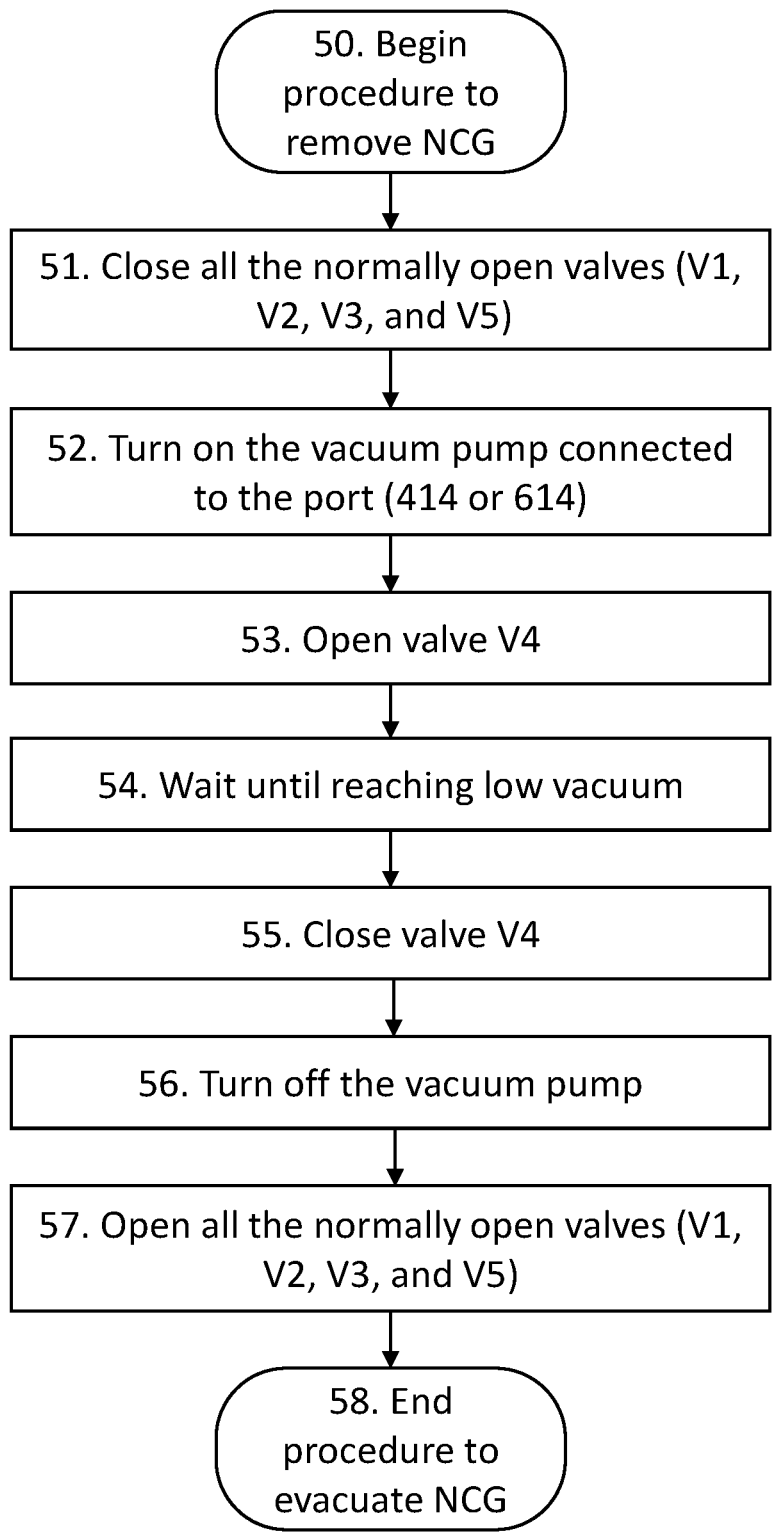
FIG. 3 diagrams a flowchart showing the steps for operating the current NCG purge system for both heat transformers and absorption chillers, adding an optional vacuum pump.

Reference is now made to FIG. 3, which is a flow chart showing an exemplary method of operating the motorized NCG evacuation used in the motorless NCG trapping method, providing for a more efficient NCG evacuation process using a standard vacuum pump. In this embodiment, during the normal operation of the absorption heat transformer, the following steps may be performed for the evacuation procedure, beginning the procedure with step 50. In step 51, all the normally open valves (V1, V2, V3, and V5) are closed. In step 52, the optional vacuum pump 429 connected to the optional port 414 is turned on. In step 53, valve V4 is opened. In step 54, low vacuum is reached in line 414 after a wait of typically several minutes. In step 55, valve V4 is closed. In step 56, the vacuum pump is turned off. In step 57, all the normally open valves (V1, V2, V3, and V5) are reopened. Step 58 completes the procedure, at which point, almost all NCGs have been evacuated from the vessel 423. The addition of a vacuum pump may be used with either of the systems described in this application—both the absorption heat transformer in FIGS. 2A, 2B and the ejector-based absorption chiller or heat transformer to be described hereinbelow, in FIGS. 4A, 4B.

Figure 4A:
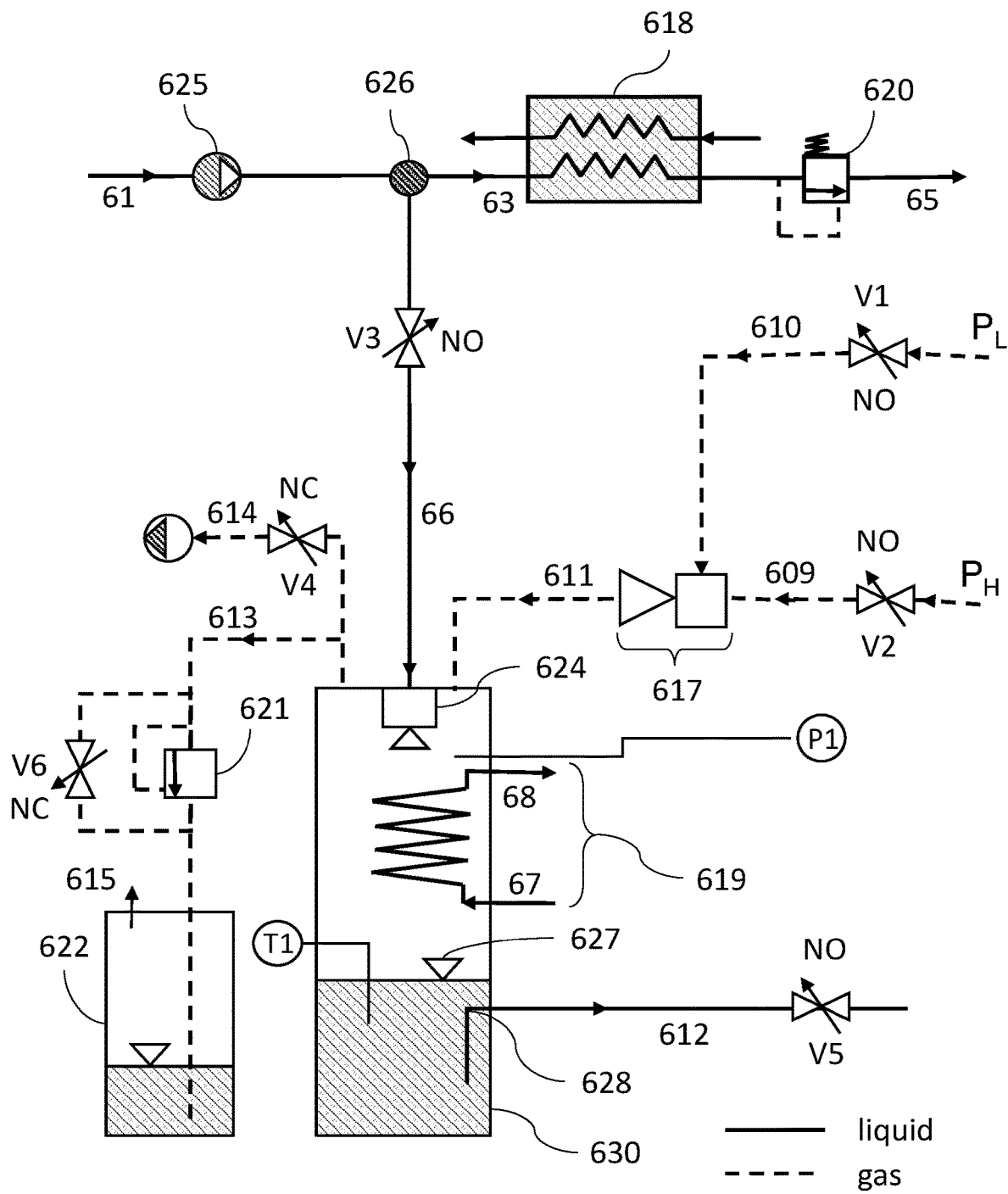
FIG. 4A illustrates an innovative ejector based motorless purge system for an absorption chiller system.
Figure 4B:
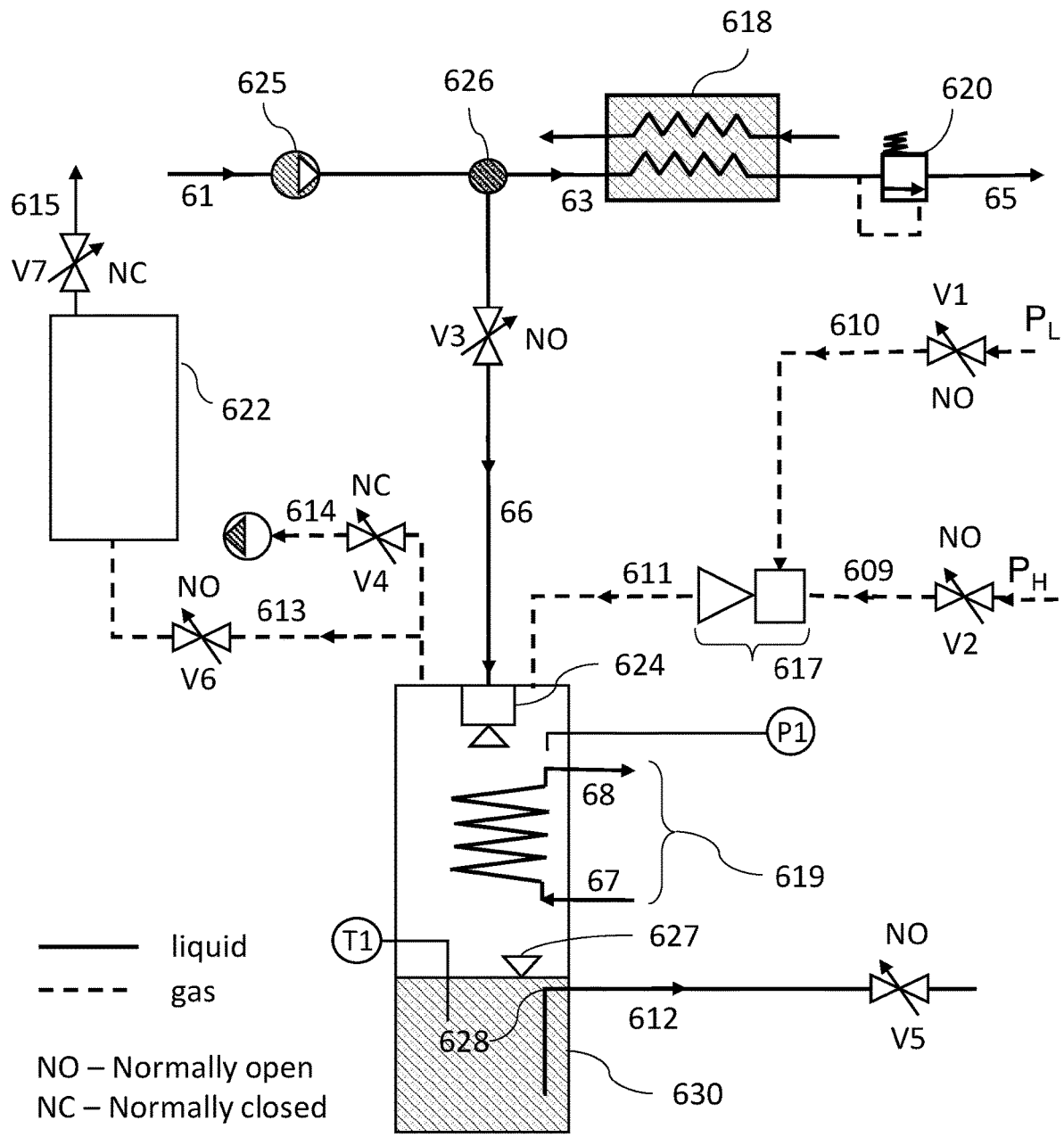
FIG. 4B illustrates an alternative evacuation method for the non-condensable gases.

Reference is now made to FIGS. 4A and 4B, showing a schematic description of an ejector based purging system for an absorption chiller system. These systems will be referred to as ejector purge systems for absorption chillers, but they are also appropriate for heat transformers. In this implementation, the purging system comprises a vacuum-tight purging vessel AV 630 including an internal heat exchanger 619, an exhaust vessel 622 for collecting water vapor and evacuating the NCGs, a steam-steam ejector 617 that may be supersonic, a solution splitter 626, and the associated valves and instruments for controlling the purging system operation. Valves V1, V2, V3, V5 are normally open during the normal operation of the absorption chiller, while valves V4 and V6 are normally closed. Solution 61 enters the system via a solution pump 625 and is split at the solution splitter 626 into two streams, one of which 63 passes through a solution-solution heat exchanger 618 and check valve 620 to the main stream 65, and the other of which, stream 66, passes through valve V3 into the purging vessel 630 via the solution spray nozzle 624. Within the AV is an internal heat exchanger 619, through which cooling water from a cooling tower flows into the vessel 630 via stream 67 and returns to the cooling tower via stream 68. The water in this internal heat exchanger 619 is self-contained and does not contact the solution within the purging AV 630 directly. The heat exchanger is located above the fluid level 627 within the purging AV 630.

The internal heat exchanger 619 is used to reduce the solution temperature/vapor-pressure to enable continuous absorption of vapor entering through 611. It is possible to omit this heat exchanger 619, but this may require an increase of solution inflow through line 66 to compensate for temperature/vapor-pressure rise due to the released heat of absorption.

Reference is now made to FIG. 4B, showing an alternative evacuation method to that shown in the implementation of FIG. 4A, Here, vessel 622 is elevated above 630. Valve 621 of FIG. 4A is not used. The vessel 622 is connected (as in FIG. 4A) to vessel 630 by line 613 and valve V6. An additional valve V7 on line 615 is added. However, in this version valve V6 is normally opened, and V7 is normally closed.

The absorption chiller operates at two pressure levels. A higher pressure, $P_H$, exists at the desorber-condenser pair, represented by stream 609, while the low pressure, $P_L$, exists at the absorber-evaporator pair, represented by stream 610 and 612. The water vapor containing NCGs is brought from both the absorber operating at lower pressure, via stream 610, and from the condenser, operating at higher pressure, via stream 609, through the ejector 617, into the AV 630 in which the water vapor will condense while the remaining NCGs are stored.

The purging system operates as follows. Saturated solution (typically LiBr-water at about ambient temperature) from the absorber is pumped by solution pump 625 and then split by the solution splitter 626 into two streams. The main stream 63 continues normally, i.e., as in its role in a typical absorption chiller, through the solution-to-solution heat exchanger 618 and the solution check valve 620 via stream 65 to the desorber (not shown). The solution branch steam 66, typically 5-10% of the total solution, passes through valve V3 and is sprayed by the solution spray nozzle 624 into the purging vessel AV 630. The required pressure of the solution, imposed by the solution pump at the spray nozzle inlet is above ambient pressure.

The spray nozzle 624 is used to distribute the solution inside the purging vessel AV 630 in an effective and simple way. In some implementations, the spray nozzle 624 may be replaced by a drip distribution system. As in the implementations shown in FIGS. 2A, 2B, calculations show that the required amount of water vapor to be absorbed is no more than 1% of the solution mass flow rate entering the purging vessel AV 630. The solution entering the purging vessel AV 630 through the spray nozzle 624 leaves the vessel 630 after absorption through the solution outlet 612 back to the absorber. To prevent direct access of vapor from the purging vessel AV 630 to the absorber space through the outlet port, the liquid solution pool inside the vessel AV 630 is maintained at a certain level 627. The shape of the tube for solution return to the absorber may include a bend 628 which is designed to ensure the minimum required liquid level of the solution pool. The level of the solution outlet tube 612 is equal to or above the level of the solution pool inside the absorber vessel (not shown).

In the purging system for the absorption heat transformer described in FIGS. 2A, 2B, a significant available temperature difference exists between the hot solution 41 flowing from the desorber and the cooler condensate water 48 flowing from the condenser, which is used as a heat sink for the solution as water and solution pass through the water-solution heat exchanger 419. The heated water returns to the evaporator via stream 49 and the cooled solution 47 flows to the absorption vessel 423. Hence, in that implementation, it is feasible to obtain a subcooled solution capable of absorbing water vapor adiabatically. In the implementation shown in FIGS. 4A, 4B for absorption chillers, the solution 61 coming from the absorber has almost the same temperature of the available ambient heat sink. Hence, the purging vessel AV 630 must be an internally cooled absorber.

The pressure that would exist in the purging vessel AV 630 is almost equal to the lower pressure, $P_L$, of the chiller absorber (not shown). The pressure could be slightly higher or lower depending on the temperature of the heat sink, i.e., the internal heat exchanger 619. Thus, vapor would not automatically be drawn into the vessel AV 630 at a sufficient rate. Hence, a steam-to-steam ejector 617 is used to force vapor to flow from the chiller absorber in stream 610 at $P_L$ into the vessel AV 630 via stream 611. The ejector 617 uses the high-pressure vapor stream 609 at $P_H$ from the condenser as the motive stream to entrain a secondary vapor stream 610 from the absorber, both streams passing through the ejector 617. Both streams 609 from the condenser and 610 from the absorber, after passing through the ejector's diffuser, enter the purging absorption vessel AV 630 at a pressure level that lies between the pressure levels of the absorber and condenser. The pressure level at the ejector outlet enables the purging vessel AV 630 to operate at a pressure above that of the chiller absorber, saving the need for a special, thermally designed absorption vessel.

In prior art purge systems, the ejectors, which are a key component, employ a liquid motive stream to entrain a vapor of much larger specific volume. In addition, there is a risk of liquid motive solution stream boiling inside the ejector. Therefore, a design that includes a heat exchanger for pre-cooling the solution prior to its entrance to the ejectors is essential. This pre-cooling involves a reduction of the power and coefficient of performance of the system. To avoid the above difficulties, the current application employs a vapor motive stream 609 to entrain the vapor stream 610, in common with conventional ejector use, which is to employ a vapor motive stream to entrain vapor, or a liquid motive stream to entrain liquid Separation of the non-condensable gases present within the vapor is achieved as a result of absorbing the water vapor by the internally cooled LiBr—$H_2O$ solution (or other refrigerant absorbent solution). The non-absorbable NCGs accumulate inside the purging vessel AV 630 until the evacuation process is performed.

For an absorption chiller working at steady state conditions, the solution at the outlet of the absorber 61 has a certain concentration, for example 0.55 LiBr mass fraction.

Hence, for the case where no NCGs are present in the vapor phase and a certain solution concentration is present in the AV 630, a correlation exists between the temperature (T) and saturation pressure (P) inside the purging vessel AV 630. The solution concentration can be measured or estimated according to steady state calculations. The expected solution saturation pressure may be calculated as a function of the solution concentration and temperature measured by the temperature sensor T1. Comparing the actual pressure of the solution measured by the pressure sensor P1 with the calculated saturation pressure of the solution inside the purging vessel AV 630 provides a good estimation of the amount of NCGs accumulated inside the vessel.

The absorption inside the vessel causes a release of the heat of absorption. This heat could be estimated by measuring the temperature difference of the cooling water at the inlet 67 and outlet 68 of the internal heat exchanger 619. By accumulation of NCGs inside the vessel 630, the intensity of the absorption process will decrease and consequently, so will the temperature difference of the cooling water. Therefore, measuring the temperature increase of the cooling water could be a good qualitative reverse indicator of the amount of NCGs accumulated inside the vessel.

When a certain amount of NCG has accumulated inside the AV 630, as determined by the aforementioned method, or by any other means, an evacuation process may be activated to remove the NCGs. The evacuation process could be implemented during the normal operation of the chiller by simply closing valves V1, V2 and V5 to prevent access of vapor from the condenser in stream 609 via valve V2 and from the absorber in stream 610 via valve V1, and return of solution to the absorber in stream 612 through valve V5.

For the typical case where the AV 630 is operating below atmospheric pressure, closing valve V5 while continuing to inject more solution through the spray nozzle will cause a rise of the pressure and the solution pool level 627 in purging absorption vessel 630. Next, two methods are proposed:

1. (FIG. 4A) When a pressure above ambient is reached, the elevated liquid level 627 and the increased pressure, measured by probe P1, will force the vapor to flow out of the purging vessel AV 630 through the gas check/relief valve 621 to the liquid (water or solution) pool of the exhaust vessel 622. The water vapor passing through the liquid pool will condense within the liquid while the NCGs will migrate—in the form of bubbles—to above the liquid pool and through the vent exit 615 to the ambient environment. This process should be stopped as soon as the liquid level in vessel 622 begins to rise—indicating that all the gasses have been removed from 630. At this point valve V5 should be reopened until the measured pressure P1 drops to the low pressure vessel level. At this point, V1 and V2 are reopened and the system returns to normal operation. Note that at this point the pressure in vessel 622 is ambient, and the pressure in vessel 630 is much lower. The amount of solution which was transferred from the AV 630 to the exhaust vessel 622 during the evacuation process should be returned to vessel 630. This can be done by opening valve V6 to enable the return of some liquid from the exhaust vessel 622 to the AV 630, and then closing valve V6 again. This process may be performed manually by an operator at intervals to be determined based on need or as part of a scheduled routine maintenance; alternately, the process may be partly or fully automated. If the purging vessel AV 630 operates at above atmospheric pressure, the gas check/relief valve 621 should not be used. Instead, opening the normally-closed valve V6 will release the accumulated NCGs to the exhaust vessel 622. After this evacuation process, V6 is closed again.

2. (FIG. 4B) During steady state chiller operation, V6 is normally open (NO). During the evacuation process, as the solution fills vessel 630, the pressure will increase and will fill vessel 622 with a mixture of pressurized NCGs, some vapor, and possibly some liquid solution (depending on the volume of 622). When the pressure stabilizes above atmospheric pressure, V6 is closed. Next, the normally closed (NC) V7 is opened to release the pressurized gases to the atmosphere. A few seconds later, after the accumulated NCGs have been released, V7 is closed, and then V6 and V5 are opened until the measured pressure P1 drops to the low pressure vessel level. At this point, V1 and V2 are reopened and the system returns to normal operation.

If an optional vacuum pump 629 is available, it is recommended to connect it through line 614 as also shown in FIG. 4A, because it can replace the above processes in case of a malfunction. In this motorized evacuation process, it is crucial to keep V3 closed throughout the evacuation stage of vessel 630, to make sure that liquid solution will not enter the vacuum pump. This evacuation mode is also useful in case solution pump 625 is unable to produce above atmospheric pressure at line 66. Note that although this evacuation process is motorized, the NCGs trapping process in the AV (630) is motorless. In addition, this vacuum pump method is a more efficient than alternative methods using a vacuum pump for two reasons: (1) the pump is not continuously operated, and only removes gases from an isolated vessel 630, and, (2) no special requirements for the vacuum pump are needed, such as in-line oil-free operation. In this alternate implementation, the evacuation process could be implemented using a standard type of vacuum pump 614. In this case, again during the normal operation of the chiller, the same steps for the evacuation task are performed as described in the flowchart of FIG. 3.

The various implementations of the system described in the present disclosure may serve in a range of systems employing absorption heat pumps using a range of working fluids, as a reliable purge system is critical for both cooling and heating applications. Some applications for the presently disclosed devices are absorption chillers, e.g., air conditioning applications, and heat transformers, e.g., heat-driven industrial processes, for both of which purge systems are essential.

An important advantage of this invention lies in a purge system that operates continuously in a motorless fashion, enabling the absorption heat pump to operate uninterruptedly while keeping the system free from deleterious NCGs. Additional advantages are apparent. For the absorption heat transformer purging, the system uses an AAV with the solution supplied by a spray nozzle. This is a simple design, which avoids the use of ejectors or complex secondary absorbers. The condensate water supplied to the evaporator recovers the heat extracted from the solution for subcooling. The current method is simpler to design and requires no ejectors. It is more effective and more energetically efficient than other known methods.

For absorption chiller purging, the current system makes it possible to accomplish the purging using a secondary absorber which could operate at a higher pressure than that of the absorption chiller absorber, and consequently the required heat sink temperature could also be higher. This could be achieved by using a simple gas-gas ejector that utilizes the normally existing pressure difference between the condenser and absorber of the absorption chiller. The current method is simpler to design (using a simple conventional gas-gas ejector) and more effective and robust, in that it is less sensitive to the system operating conditions and does not require the purging absorber to be cooler or at a lower pressure than the main absorber.

For both heat transformers and chillers, the system in the present disclosure is meant to replace other purging methods, performing the function of NCG evacuation by a motorless device, enabling the absorption heat pump to operate uninterruptedly and reliably.

It is appreciated by persons skilled in the art that the present invention is not limited by what has been particularly shown and described hereinabove. Rather, the scope of the present invention includes both combinations and sub-combinations of various features described hereinabove as well as variations and modifications thereto which would occur to a person of skill in the art upon reading the above description and which are not in the prior art.

We claim:

1. A purge system for removing non-condensable gases from a closed cycle absorption transformer heat pump, said purge system comprising:
    an absorption vessel adapted to collect through a first valved fluid passageway, a portion of the absorbent solution of said closed cycle absorption transformer heat pump;
    a heat exchanger adapted to cool said portion of the absorbent solution;
    an absorbent solution distributer adapted to introduce said portion of said absorbent solution into said absorption vessel, such that said absorbent solution absorbs absorbate vapor entering said absorption vessel;
    an exhaust vessel having either a one-way vent or a valved exit to exhaust non-condensable gases collected therein, said exhaust vessel fluidly connected to said absorption vessel; and
    further valved fluid passageways adapted to convey (a) absorbate vapor from an absorber and from a condenser of said closed cycle absorption transformer heat pump, into said absorption vessel, and (b) solution accumulated in said absorption vessel, to said desorber,
    wherein closing of said further valved passageways is configured to increase the pressure in said absorption vessel, such that, said non-condensable gases are collected in said exhaust vessel, from where they are expellable through either said one-way vent or said valved exit.

2. The purge system according to claim 1, wherein said absorption vessel is adapted to function at a lower pressure than said absorber and said condenser, such that said absorbate vapor entering said absorption vessel condenses to a liquid, while non-condensable gases entering said absorption vessel remain in a gaseous state.

3. The purge system according to claim 1, wherein said further valved passageways are adapted to be closed when the concentration of accumulated non-condensable gases in said absorption vessel reaches a predetermined level.

4. The purge system according to claim 1, wherein said exhaust vessel is adapted either to collect said non-condensable gases and absorbent solution from said absorption vessel through a check valve on a continuous basis and to exhaust them continuously from said vent exit, or is adapted to collect non-condensable gases and vapor and to release the non-condensable gases when a pressure above ambient pressure has been attained.

5. The purge system according to claim 1, wherein said absorption vessel is configured to generate a decrease in pressure either by the absorbent solution of said closed cycle absorption transformer heat pump entering said absorption vessel, or by using a gas-gas ejector adapted to entrain vapor and non-condensable gases at low pressure from said condenser, into a stream of vapor and non-condensable gases at high pressure from said absorber.

6. The purge system according to claim 1, wherein said absorbent solution distributer adapted to inject said portion of said absorbent solution into said absorption vessel under pressure, is at least a spray nozzle.

7. The purge system according to claim 6, wherein said spray nozzle is adapted to produce spray droplets of a size to enable absorption of absorbate molecules.

8. The purge system according to claim 1, wherein said valved fluid passageway that conveys fluid accumulated in said absorption vessel back to said desorber is positioned at a height that prevents absorbent solution backflow from said desorber to said absorption vessel.

9. A method for purging of non-condensable gases from the absorbent solution of a closed cycle absorption transformer heat pump, said method comprising:
    (a) cooling a sample of said absorbent solutions using a heat exchanger;
    (b) introducing said cooled sample of said absorbent solution through a first valve into an absorption vessel such that said sample disperses into droplets, said droplets having the capacity to absorb absorbate in said absorption vessel, said absorbate being received through valved passageways as vapor from said absorber and from said condenser;
    (c) returning solution from said absorption vessel through a further valved passage to said desorber;
    (d) when the concentration of non-condensable gases in said absorption vessel has reached a predetermined level, closing said valved passageways and said first valve, such that the pressure in said absorption vessel increases, so that vapor comprising non-condensable gases from said absorption vessel is transferred via a further passageway, to an exhaust vessel having either a one-way vent or a valved exit; and
    (e) exhausting said non-condensable gases from said exhaust vessel through either said one-way vent or said valved exit.

10. The method according to claim 9, wherein said cooled sample of said absorbent solution is introduced into said absorption vessel through at least a spray nozzle.

11. The method according to claim 9, wherein said exhaust vessel either collects said non-condensable gases and absorbent solution from said absorption vessel through a check valve on a continuous basis and exhausts them continuously from said one-way vent exit, or it collects non-condensable gases and vapor, and releases the non-condensable gases when a pressure above ambient pressure has been attained by transfer of vapor comprising non-condensable gases from said absorption vessel to said exhaust vessel via said further passageway.

12. The method according to claim 9, wherein said increase in pressure in said absorption vessel is generated either by the pressure of the absorbent solution of said closed cycle absorption heat pump, entering said absorption vessel, or by use of a gas-gas ejector adapted to entrain vapor and non-condensable gases at low pressure from said condenser, into a stream of vapor and non-condensable gases at high pressure from said absorber.

13. A purge system for removing non-condensable gases from a closed cycle absorption chiller system, said purge system comprising:

an absorption vessel adapted to collect through a first valved fluid passageway, a portion of the absorbent solution of said closed cycle absorption chiller system;

an absorbent solution distributer adapted to introduce said portion of said absorbent solution into said absorption vessel, such that said absorbent solution absorbs absorbate vapor entering said absorption vessel;

a gas-gas ejector adapted to entrain vapor and non-condensable gases at low pressure from an absorber of said closed cycle absorption chiller system, into a stream of vapor and non-condensable gases at high pressure from a condenser, for entry into said absorption vessel;

an exhaust vessel having either a one-way vent or a valved exit to exhaust non-condensable gases collected therein, said exhaust vessel fluidly connected to said absorption vessel; and further valved fluid passageways adapted to convey (a) absorbate vapor from an absorber and from a condenser of said closed cycle absorption heat pump into said absorption vessel, and (b) solution accumulated in said absorption vessel to said absorber, wherein closing of said further valved passageways is configured to increase the pressure in said absorption vessel, such that said non-condensable gases are collected in said exhaust vessel, from where they are expellable through either said one-way vent or said valved exit.

14. The purge system according to claim 13, wherein said further valved passageways are adapted to be closed when the concentration of accumulated non-condensable gases in said absorption vessel reaches a predetermined level.

15. The purge system according to claim 13, wherein said exhaust vessel is adapted either to collect said non-condensable gases and absorbent solution from said absorption vessel through a check valve on a continuous basis and to exhaust them continuously from said vent exit, or is adapted to collect non-condensable gases and vapor, and to release the non-condensable gases when a pressure above ambient pressure has been attained.

16. The purge system according to claim 13, further comprising a heat exchanger disposed internally within said absorption vessel.

17. The purge system according to claim 13, wherein said solution distributer adapted to inject said portion of said absorbent solution into said absorption vessel under pressure, is at least a spray nozzle.

18. The purge system according to claim 13, wherein said spray nozzle is adapted to produce spray droplets below a predetermined size, such that the surface to volume ratio of said drops ensures rapid absorption of absorbate molecules.

19. The system according to claim 13, wherein said valved fluid passageway that conveys fluid accumulated in said absorption vessel back to said absorber is positioned at a height that prevents absorbent solution backflow from said absorber to said absorption vessel.

20. A method for purging of non-condensable gases from the absorbent solution of a closed cycle absorption chiller heat pump, said method comprising:
  (a) introducing a sample of said absorbent solution into an absorption vessel, such that said sample disperses into droplets, said droplets having the capacity to absorb absorbate in said absorption vessel, said absorbate being received through valved passageways from an absorber and a condenser of said heat pump, and introduced into said absorption vessel using a gas-gas ejector adapted to entrain vapor and non-condensable gases at low pressure from said absorber of said closed cycle absorption chiller system, into a stream of vapor and non-condensable gases at high pressure from said condenser;
  (b) returning solution from said absorption vessel through a passage having a first valve, to said absorber;
  (c) when the concentration of non-condensable gases in said absorption vessel has reached a predetermined level, closing said valved passageways and said first valve, such that the pressure in said absorption vessel increases, so that vapor comprising non-condensable gases from said absorption vessel is transferred via a further passageway, to an exhaust vessel having either a one-way vent or a valved exit; and
  (d) exhausting said non-condensable gases from said exhaust vessel through either said one-way vent or said valved exit.

21. The method according to claim 20, wherein said absorption solution in said absorption vessel is cooled by a heat exchanger within said absorption vessel.

22. The method according to claim 20, wherein said cooled sample of said absorbent solution is introduced into said absorption vessel through at least a spray nozzle.

23. The method according to claim 20, wherein said increase in pressure in said absorption vessel is generated either by the pressure of the absorbent solution of said closed cycle absorption heat pump, entering said absorption vessel, or by said gas-gas ejector.

* * * * *